United States Patent [19]

Gray

[11] Patent Number: 5,426,421
[45] Date of Patent: Jun. 20, 1995

[54] METHOD OF AUTOMATICALLY MANAGING A NETWORK OR REMOTE FUNCTION-EXCECUTING APPARATUS FROM A PROGRAMABLE NETWORK CONTROL CENTER

[76] Inventor: William F. Gray, 512 Herndon Pkwy., Herndon, Va. 22070

[21] Appl. No.: 156,973

[22] Filed: Nov. 24, 1993

Related U.S. Application Data

[63] Continuation of Ser. No. 658,847, Feb. 22, 1991, abandoned, which is a continuation-in-part of Ser. No. 149,671, Jan. 28, 1988, Pat. No. 4,996,703, which is a continuation-in-part of Ser. No. 853,893, Apr. 21, 1986, Pat. No. 4,748,654.

[51] Int. Cl.$^6$ ................. G05B 23/02; G05B 15/02
[52] U.S. Cl. .................. 340/825.15; 340/825.06; 340/825.07; 364/146
[58] Field of Search ............. 340/825.31, 825.06, 340/825.07, 825.15, 825.18, 310 A, 310 R; 364/132, 141, 144, 146

[56] References Cited

U.S. PATENT DOCUMENTS

| | | | |
|---|---|---|---|
| 4,419,667 | 12/1983 | Gurr et al. | 340/310 A |
| 4,484,258 | 11/1984 | Miller et al. | 340/825.07 |
| 4,532,509 | 7/1985 | Pulverenti et al. | 340/825.15 |
| 4,672,374 | 7/1987 | DesJardins | 340/825.07 |
| 4,748,654 | 5/1988 | Gray . | |
| 4,972,367 | 11/1990 | Burke | 364/141 |
| 4,996,703 | 2/1991 | Gray | 340/825.22 |

OTHER PUBLICATIONS

"Network Site Management: The Portable Solution for Troubled Sites", pub. 1988.
"Master*Link: Your On-Site Field Engineer and Headquarters Analyst", pub. 1987.

Primary Examiner—Donald J. Yusko
Assistant Examiner—Mark H. Rinehart
Attorney, Agent, or Firm—Leydig, Voit & Mayer

[57] ABSTRACT

A network includes a network control center which stores network management software capable of supporting user-composed programs for automatically managing apparatus at remote sites, each apparatus including a microprocessor, memory and input/output devices interconnected by a bus, connected to remote site equipment. The network control center includes a single partitioned memory device, or various memory devices. A master site memory section stores a master site listing of all of the remote sites. A master function memory section stores a master function listing of all possible functions to be executed by the apparatus at each site. In managing the network of apparatus, a user composes a listing of plural sites selected from the master site listing and a listing of functions for each site from the master function listing, which are stored in a correlated listing memory section. After the correlated listing has been stored, upon a single execution signal set by the user, commands representing the selected functions are transmitted over communication links to the selected sites, without further participation by the user, and the apparatus at the selected sites executes the functions upon receipt of the commands.

15 Claims, 4 Drawing Sheets

1

METHOD OF AUTOMATICALLY MANAGING A NETWORK OR REMOTE FUNCTION-EXCECUTING APPARATUS FROM A PROGRAMABLE NETWORK CONTROL CENTER

RELATED APPLICATIONS

This application is a continuation of application Ser. No. 07/658,847, filed Feb. 22, 1991, now abandoned, which was a continuation-in-part of application Ser. No. 07/149,671, filed Jan. 28, 1988, now U.S. Pat. No. 4,996,703, which was a continuation-in-part of application Ser. No. 06/853,893, filed Apr. 21, 1986, now U.S. Pat. No. 4,748,654.

TECHNICAL FIELD

This invention relates to a method and apparatus for operating a plurality of programmable controllers, located at remote equipment sites on a network, from another network site.

BACKGROUND OF THE INVENTION

It has been known to provide units to electrically monitor operational and environmental conditions of equipment located at operating sites. It has also been known to combine control units with monitoring units in order to control equipment when conditions out-of-range of programmed parameters are detected, and to allow a controller to correct the problem causing the out-of-range conditions. The equipment may be computers, data transmission equipment, sub-stations, processing equipment or other types of equipment, and may be unmanned, or may be manned by operators during the day but unmanned at night. Also, such sites even when operators are in attendance may have no maintenance personnel in attendance day or night.

One type of such monitor and control unit is a programmable controller disclosed in U.S. Pat. No. 4,748,654. As disclosed in this patent, the programmable controller is connected to sense equipment conditions and generate an alarm when conditions are sensed that deviate from a desired range of parameters, and then automatically dial one or a series of telephone numbers to locate maintenance or supervisory personnel through the use of the public telephone network. The controller is equipped to transmit over the telephone network to an operator at a dialed location, information about the alarm condition in the form of synthesized voice messages. The operator can use push-buttons on his telephone to produce dual tone, multi-frequency (DTMF) signals to enter various user access codes to receive information about the alarm conditions and to set switches and the like to control the equipment at the site.

In addition, through use of the push-button telephone, the operator can access the controller at the site through the use of a valid password to enter new parameters and can reprogram the controller at the site to correct conditions as they are recognized by the operator. For this purpose, the controller is programmable to define the source of control commands and the response to the control commands, depending on whether the apparatus is in an operator-controlled or automatic mode. In addition to the aforesaid U.S. Patent, further details of this type of programmable controller may be obtained by referring to application Ser. No. 07/149,671, filed Jan. 28, 1988, now U.S. Pat. No. 4,996,703. The disclosures of these applications and patents are incorporated by reference.

SUMMARY OF THE INVENTION

The main object of this invention is to provide an improved network management system which employs a programmable network controller at a network site that is effective, responsive to a single action by the operator, such as the striking of a single key on the keyboard (a) to communicate with a plurality of selected site controllers on the network and (b) to command predetermined functions be carried out at each of the selected site controllers, without further action by the operator.

A further important object is to restore remote facilities and to minimize down-time due to such causes as software crashes, carrier losses, temperature excesses, power outages, modem failures and the like by automatically communicating with selected site controllers and commanding predetermined functions be carried out at each controller to correct the causes of site failures.

A related object is to provide an improved network management system which utilizes programmable site controllers at remote sites to restore service to the sites in seconds, and minimizes the delay and costs of technician visits. A further object is to cause the programmable site controllers at plural remote sites to receive commands from a network controller to carry out operations to restore service and to perform other selected functions, and to transmit return messages to the network controller reporting that service is restored and the functions have been performed so that the commanded operations are acknowledged and logged.

A further object is to provide improvements in network controllers which allow for serially communicating with selected controllers, and receiving interleaved responses therefrom. It is also an object to reduce site down-time and to eliminate the need for most emergency-caused site visits by enabling equipment operations, directed by a network controller, at selected remote sites.

A related object is to realize out-of-pocket savings to recover the cost of the site controllers in a very short time and thereby make the system of this invention highly cost effective and valuable economically to users.

Further objects will appear from the following description taken in conjunction with accompanying figures.

DISCLOSURE OF THE BEST MODE

Figure 1:
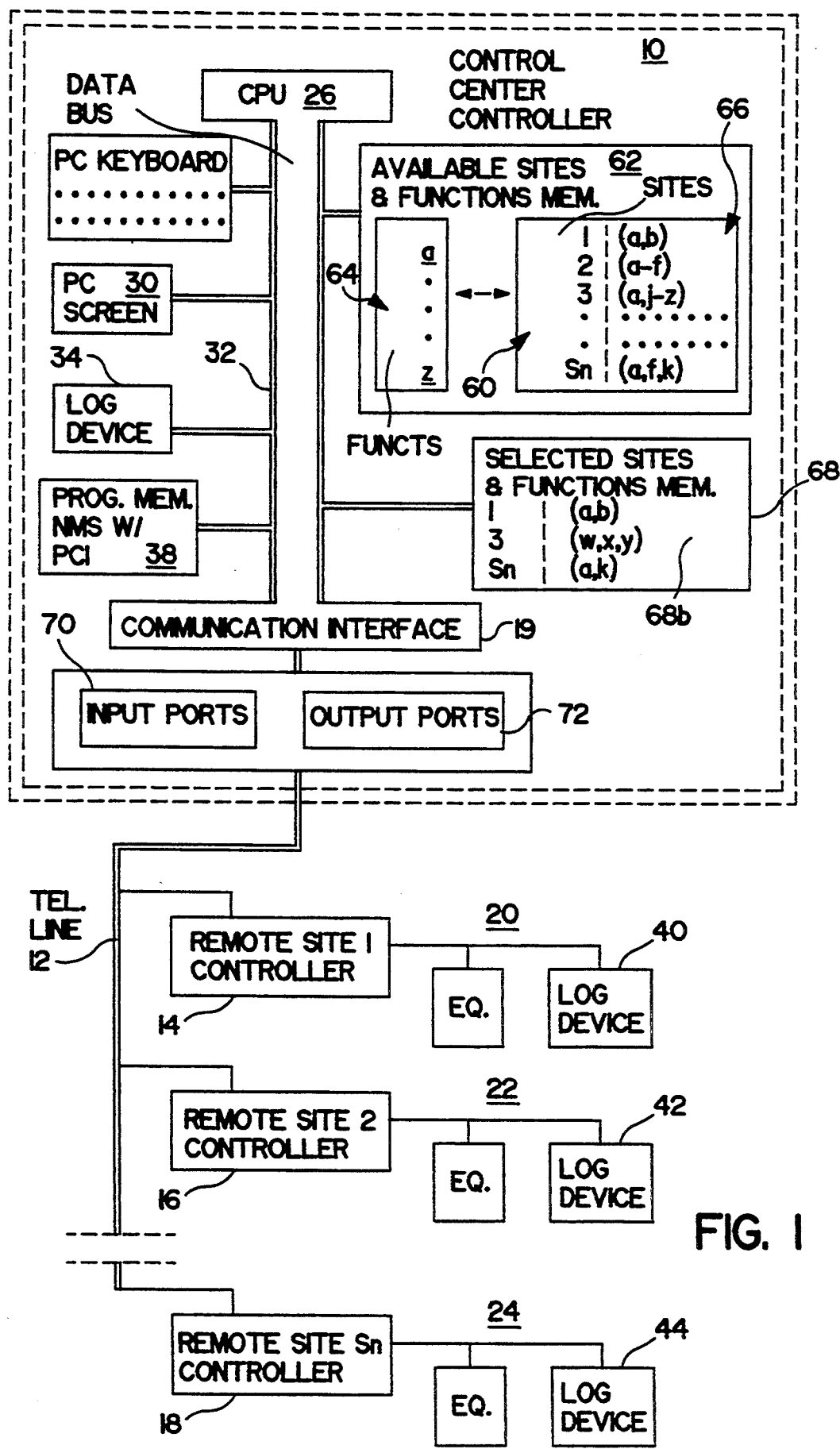
FIG. 1 illustrates diagrammatically the improved network management system of this invention.

Referring to FIG. 1, a network management system according to this invention includes a network controller 10 connected through a telephone line 12 to programmable controllers 14, 16, 18 at plural remote equipment sites 20, 22 and 24. In accordance with a principal aspect of the invention, the network controller 10 preferably comprises a programmable computer, herein shown as a microcomputer such as a personal computer (denoted PC herein), equipped with network management software (denoted NMS in FIG. 1) to carry out the network management functions.

The site controllers 14, 16, 18 each preferably comprise a programmable controller of the type disclosed in U.S. Pat. Nos. 4,748,654 and 4,996,703. However, other types of controllers may be used if capable of performing the functions allowed by the controllers disclosed in these patents.

Illustrated in FIG. 1 are the principal components of the network controller 10 including a data bus 32 connecting a CPU 26, a keyboard 28 and a screen 30. Also connected to the bus 32 is a programmable memory section 38 in which the network management software (NMS) unique to this invention is installed. In keeping with this invention, the data memory section 62 is partitioned into memory sections 64, 66. The partitions 64, 66 of the memory section 62 contain listings of all the network sites and available functions of the programmable controllers at the plural sites, so that an operator of the network controller 10 can direct the functions of the network management system and thereby carry out this invention.

A communication module 19 includes the necessary hardware and software to communicate, through input/output ports 70, 72 of the network controller 10, with the site controllers 14, 16, 18. As shown, the network has N remote sites with a site controller 18 located at the Nth site (denoted $S_n$) while the controllers 14 and 16 are at sites 1 and 2. Thus, it should be realized that many sites may be included within the network, and they may be located wherever communication may be provided as by a telephone link 12 to the equipment sites.

In the illustrative network, the network controller is located at a control center. However, according to a principal feature of the invention, the network controller may be located at any site in the network. Furthermore, more than one network controller may be provided at different locations and connected to communicate with a single site controller or a plurality of site controllers. Thus, the present invention affords a higher degree of flexibility than conventional centralized network control systems.

REMOTE SITE CONTROLLERS

Figure 2:
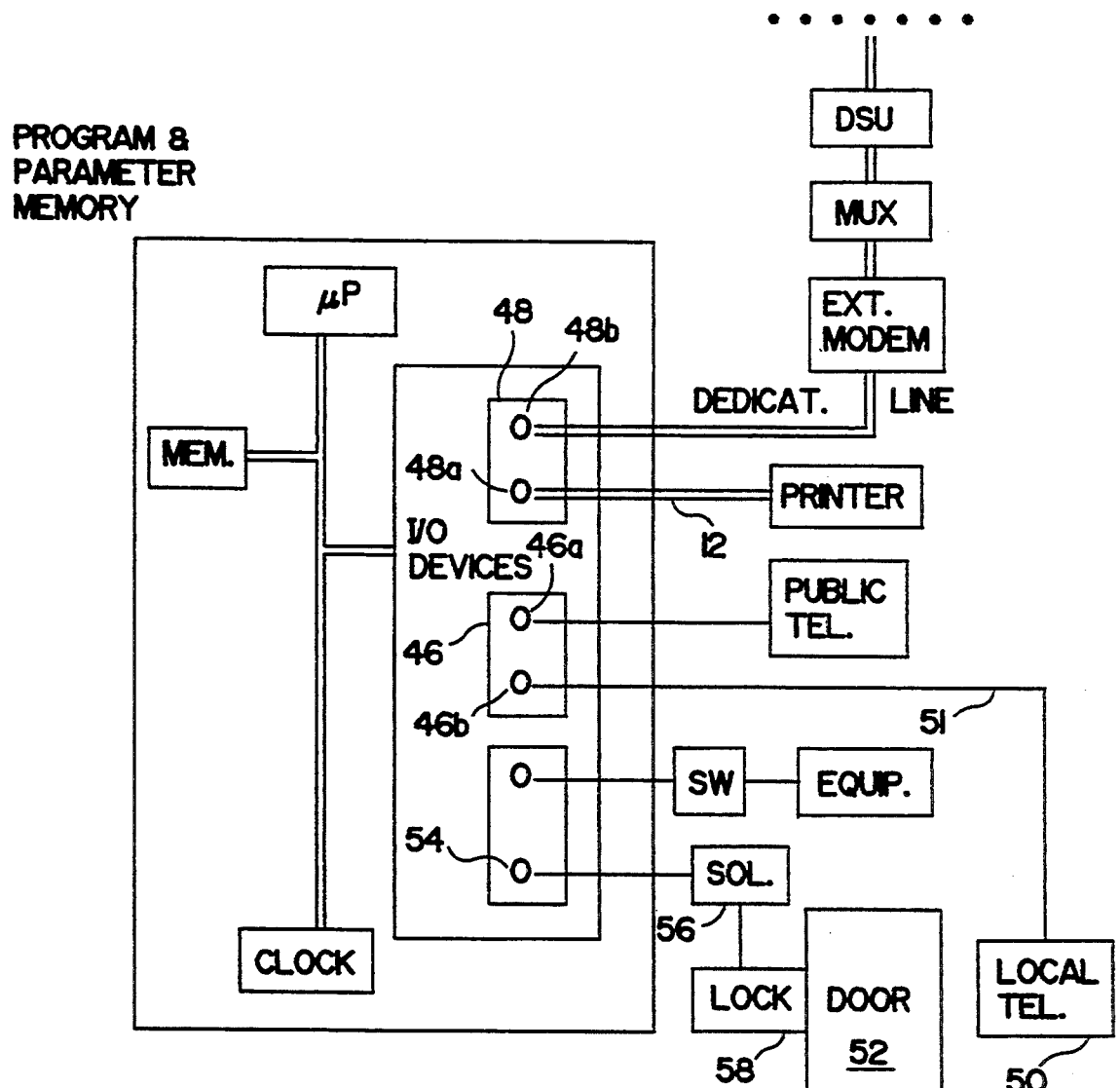
FIG. 2 is a schematic illustration of a preferred remote site controller.

Before providing a detailed description of the construction and operation of the network controller 10 of the present invention, a general description is provided of the preferred form of programmable site controllers 14, 16, 18 for the remote sites, as illustrated schematically in FIG. 2. Further details may be obtained from the patents referred to above. The present description focuses on the manual operation of the remote controllers, as disclosed in these patents, wherein these controllers provide a voice-synthesized menu driver. This manual operation method is compared with the automatic operation mode according to the present invention.

Each site controller has an internal system preferably equipped to monitor itself and to monitor and control on-site equipment. For monitoring, conventional digital and analog monitoring devices are used to monitor at a remote site such parameters of equipment operating components as signal strengths, temperatures, power, pressure, switch SW closures and the like. These are compared to high/low thresholds (in analog monitors) and normal closure positions (in digital monitors) to determine alarm conditions. Should there be a measured condition which exceeds one of the thresholds, the system contains means for dialing in sequence over the public telephone system different telephone numbers to alert operating personnel of an alarm condition. When a telephone is answered at one of those locations the condition is described by synthesized voice to the answering telephone operator after the system receives a valid password keyed in by the operator.

The system contains means for storing data concerning a history of previous alarms which is made available upon receipt of the appropriate password. A printer can be provided for logging every transaction, for example, noting location, time, date, port, condition and the operator involved.

A remote operating site at which is located a site controller may include any form of equipment which requires monitoring of its operating parameters. In addition, at the remote site is a conventional push-button telephone connected to the system and a printer similarly connected to the system.

In addition to communication from a single remote site controller 14 to an operator of a telephone, two-way communication with the network controller 10 may also be accomplished via the public telephone system preferably using standard modem tones to transmit passwords, commands and data. After accessing the site controller 14 through use of a password, an inquiry may be made from the network controller 10 as to the status of the various operating parameters and alarm conditions. If desired, the operator, again through the transmission of appropriate password and command codes to the site controller 14 can obtain a recent maintenance history of the monitored site. This history contains a listing of alarm conditions, including alarm port and alarm description, date and time, alarm duration in days, hours, minutes and seconds along with the operator's identity number and site identification. If it is found that the monitored equipment is operating improperly or other forms of operation or parameter changes are needed, the site controller 14 may be commanded to achieve the desired operation. Finally, should an alarm condition be noted, certain controls at the remote site can be set, by transmitting signals from the network controller 10, which in turn make the appropriate switch settings to carry-out the control functions, or control may be achieved by automatic mode. In automatic mode the alarm condition is programmed to set certain controls without operator intervention.

In addition to the connection through the telephone system to the network controller 10, as noted above each site controller 14, 16, 18 is programmed to be connected to telephones at other predetermined locations connected to the telephone system. Should a site controller note an alarm condition, it can be programmed to call in sequence, in this example up to six telephones at any six locations to attempt to reach a user who can take the appropriate steps to correct the condition. When one of the operators is reached, as discussed above, the operator may request additional diagnostic information by simply using the telephone keypad. The operator may also direct a control function to initiate remote testing and to switch to standby equipment.

Every transaction may be logged on a printer at the equipment site, and at the same time transmitted to printers at any other location with a telephone. Logged information includes, for example, time to the nearest second, site identification, alarm port and activity description, date and the individual involved in the operations.

The entirety of the operations of each of the site controllers 14, 16, 18 are monitored and controlled by means of a conventional microprocessor included in the internal system and denoted P in FIG. 2. The microprocessor in conjunction with memory and input/output devices form the hardware of the site controllers. The devices are all connected together by a microprocessor bus. The microprocessor executes a program in memory and has configuration parameters stored in memory.

A real time clock is used to provide time and date status to the software. It also provides interrupts to the microprocessor to initiate sensor scanning. The real time clock is implemented in hardware and connected to the microprocessor bus.

A block of digital input/output ports are connected to the microprocessor via the data bus. Typically the block of input/output ports interfaces through a standard 50-pin connector which, in the controller disclosed in the cited patents, contains twelve alarm inputs and four control outputs.

Another device which might be referred to as an input/output device is a speech synthesizer which is of conventional construction. In accordance with known programming principles the microprocessor commands the speech synthesizer to produce various words and to form them into recognizable sentences. The vocabulary for the speech synthesizer is contained in a read-only memory.

A dual tone, multi-frequency (DTMF) transceiver of known construction is provided. The receiver portion receives dual tone, multi-frequency signals from a push-button telephone anywhere in the telephone network to receive various commands to cause the site controller to perform the various functions described hereinabove. As will be discussed, the user might be provided with a command menu which will guide him in providing the appropriate commands. The transmitter portion permits dialing through the public telephone network. The transceiver also includes a call process monitor used in the dialing process to detect the various states during a call such as a dial tone, busy, ring back and the like. If, for example, a busy tone is detected the microprocessor will detect it, and the call will be placed later. When the dial tone is detected, it dials and then waits for ring back or a busy signal. The call progress monitor also detects the absence of ring back, i.e., the operator answering the telephone.

Another input/output block connected to the microprocessor bus is a universal synchronous receiver transmitter (UART) of conventional construction. As is known, this device is used for transmitting serial data. It is a single channel UART with a baud rate generator on the chip. It connects to a level converter, which converts the signals to a level compatible with a standard EIA/RS232 signal output. The UART also is directly connected to a conventional modem. This modem serves to transmit bit serial data from, the UART through the telephone line using standard modem tones.

The speech synthesizer, DTMF transceiver and modem each have analog outputs, and are ultimately coupled to the public switched telephone system. The input/output ports of the foregoing components are connected, respectively, to a conventional hybrid circuit block. As is known, a hybrid is used to convert a standard two-wire interface from the public telephone network to a transmit and receive path. In this case the transmit path is from the hybrid to the telephone network. This path comprises the output from the speech synthesizer and its filter, the output of the modem and the output from the DTMF transceiver. The receive output of the hybrid provides the inputs to the modem and the DTMF transceiver. These inputs and outputs are coupled through the hybrid, are converted in the known manner, and sent to a data access arrangement. This data access arrangement (DAA) is a known device required in the United States by the Federal Communications Commission to comply with a rule known as FCC part No. 68 for connections to public switched telephone networks. In essence, this element provides isolation to protect the telephone network from any electrical eccentricities of the site controller.

It can be said that switching block is an interface between the site controller and a human operator. At this point the operator can interact locally with the site controller.

An alarm indicator in the switching block will blink if there is an unacknowledged alarm. It will be on for an acknowledged alarm and off if no alarm is present. The alarm indicator is also used to indicate that the self-check or system check has, as detected by the microprocessor, determined the existence of an error or defect in the site controller. An input/output block connected to the microprocessor by the data bus is an analog-to-digital converter. It contains a multiplexer for selecting 1 of 8 analog inputs. Its function is to receive analog signals from various sensors at the remote site end convert them into digital information for use by the microprocessor.

The power for the site controller is provided from the alternating current mains by means of a wall-mount transformer. A battery charger charges a battery and maintains a constant voltage on the battery in the known manner. In the event of a power outage, after the site controller has performed all its alarm and logging functions the system will deactivate itself by cutting off power to a DC-DC converter.

A power relay is controlled by a power sequencer which is in turn under the control of the microprocessor. The device performs the function, when necessary, of cutting off power to a flyback DC-DC converter and to restart the system when alternating current power is reapplied. It also performs "write protect" for nonvolatile memory. As well, it protects random access memory (RAM) during power outage and during reset. A power sequencer is formed by a logic circuit which compares power conditions to produce the desired result.

Using conventional programming techniques a primary function of the site controller is to continuously monitor the status of user equipment at the remote site in order to detect and act upon the presence of fault conditions. This is done by sampling digital and analog input signals received through a converter and comparing the results with programmed criteria. In addition, the site controller continuously monitors its own environment indicating parameters such as temperature and power availability.

All faults that are detected by the status monitoring facility are subjected to a screening process that determines whether or not the fault is to be reported to an operator. This screening process is referred to alarm management.

The system of the site controller can monitor the status of any user of the equipment providing either form "C" or form "A" alarm outputs. In the equipment disclosed in the cited patents up to 12 such signals are supported by a single system.

The input signals appear at a 50-pin connector. The type and significance of each input signal are determined by the user at any time through programming. The correlation between an input signal and user equipment is transparent to the system.

The site controller is capable of detecting and acting upon transitions in the state of each individual digital input signal. The system periodically scans the input signals to sense any two consecutive changes in state. Unused signals are not scanned.

As a result of the aforementioned status monitoring, the site controller may detect any or all of the following faults:

A. Temperature (from the temperature sensors, too high or too low);
B. AC power loss;
C. System test failures such as weak battery, conversion error, printer off-line or non-functioning non-volatile memory failure and tone generation decoding failure;
D. Digital input signals 1 through 12 including invalid form C, fault condition or disconnection; and,
E. Analog input signals (a) through (d) as either too high or too low.

When dialing out, the site controller automatically reports all unacknowledged alarms whether or not they are currently active. The last ten past alarms can be obtained through the status reporting function. The same is true of active alarms that have already been acknowledged.

In the preferred site controller the alarm records include the following information: (a) monitor point, (b) alarm condition, (c) date and time of detection, (d) date and time cleared (if cleared) (e) the identity of acknowledging operator (if acknowledged) and (f) site identification.

Status is reported to operators upon demand. Status reports can be selected individually for each of the following: (a) date and time, (b) temperature readings, (c) active alarms, (d) alarm history for the past ten alarms, (e) individual digital input states, (f) individual analog input values, (g) individual digital output states, (h) battery charge, and (i) system test.

An operator can obtain status by dialing the site controller and identifying himself using a "password". Status queries can also be made if the system dials the operator, in which case the operator is given a choice after all unacknowledged alarms have been reported. The status reporting function allows the operator to monitor equipment after an alarm has been reported. It also allows the operator to check the status of input signals that are not configured to generate alarms. Such signals may be ones that have significance only in diagnostic modes.

An important function of the site controller is the programming function. That is, the site controller 14, 16, 18 can be programmed to meet specific requirements for each installation as reflected by programmable parameters stored therein. This can be done by authorized users as often as desired from a telephone keypad at any location. As with other functions, authorization to change system parameters is controlled via a programmer password. The microprocessor controls a voice synthesizer to report the current programming parameters and to prompt new input. Validity checks are performed on operator responses. For all programmable parameters default values are predetermined and will be in effect until the unit is programmed otherwise. Changes in programmable parameters may be logged on a printer.

As a result of the aforementioned programming function, the site controllers can be programmed with any or all of the following parameters:
  (a) System Identification;
  (b) Printer Parameters;
  (c) Passwords;
  (d) Telephone Parameters (the telephone numbers to be called in case of an alarm and the sequence they are to be called);
  (e) Digital Alarm input Parameters;
  (f) Analog/Temperature input Parameters;
  (g) Control Output Parameters;
  (h) Setting Date and Time; and
  (i) Enable/Disable Autodial.

Calls to the site controllers 14, 16, 18 can be initiated from any telephone. The call begins with a known "hand shaking" protocol. The controller uses voice synthesis to announce its identification and to request a password.

The site controller can dial out using ether tone or pulse codes. The mode may be set at any time by programming. The system maintains a directory of telephone numbers in the memory and these numbers are specified by the user and can be changed as often a desired.

Using call progress monitoring the site controller can detect incoming calls and go off hook after a user-specified number of rings. Upon receiving an in-coming call the site controller identifies itself and prompts the operator to do the same. An operator that provides either a valid operator password or the programmer's password is allowed to issue commands and acknowledge alarms. An operator that gives the generic operator responses is only allowed to hear unacknowledged alarms.

The site controller is capable of decoding all 16 DTMF tones in the known manner, and these tones are interpreted according to the current state of the call in progress. DTMF tones are accepted on both auto-answer and auto-dial calls. They are generated by the operator to query for status, program the system and control the output ports.

As indicated above, the site controller may communicate via a port 48a in a serial interface 48 (see FIG. 2) with a locally attached printer and/or with remote printers and the network controller 10. In the case of a remote printer or the network controller 10 the site controller 14, 16, 18 reports information preferably in the form of bit serial data using standard modem tones. As the site controller is programmed, log printer entries are generated for the following events: (a) fault detection, (b) fault clearing, (c) alarm condition, (d) alarm clearing, (e) equipment control, (f) program parameter change, and (g) auto dial enabled/disabled.

If log entries occur at a faster rate than they can be printed, up to a maximum of twenty (20) events will be buffered. All logged events will include a time stamp to the nearest second of when they occurred.

NETWORK CONTROLLERS

As shown in FIG. 1, network controllers 10 are connected through a communication link such as a telephone communication line 12 to the programmable controllers 14, 16, 18. In accordance with this embodiment of the present invention, a single network controller 10 has programs and data stored in memory comprising network management software (NMS). This software enables automatic execution of the functions, described both above and in the referenced patents, and previously executed manually via voice interface. Thus, the NMS allows the network controller 10 to communicate with each of a plurality of the programmable controllers, transmit commands to execute predetermined functions at the respective equipment sites, and receive return messages acknowledging receipt and execution of the commands. Other types of return messages may also be provided.

In carrying out the invention, information as to each site is entered into the network controller 10 using the keyboard and is stored in its available sites and functions memory 62. Such information includes, for example, the identity of the site, (i.e. ID#), its telephone number and phone type, its location (i.e. Miami, N.Y. City, Memphis, etc.), the configuration of the programmable controller at the site (i.e. listing of analog ports, digital ports, etc.), assigned password for access to the controller at the site, and related information dealing with the individual controllers at all of the sites in the network.

The network controller 10 is programmed to call any one of the site controllers over the public telephone system, using the telephone number stored in its memory for a particular site, and after the site controller has automatically answered the call, the network controller is programmed to transmit its password and establish a communication link with the site controller through the line. For this purpose the network controller is provided with conventional communication software and hardware, known in the art, to establish and maintain communication over the telephone lines, including a communication interface 19 which preferably has a DTMF transceiver, UART, decoder, modem, and DAA device.

With a password having been given and transmitted to a site controller that permits checking status of the site controller, acknowledging alarms, controlling on-site equipment, and reprogramming parameters, the commands to obtain such data or to direct execution of control functions or reprogramming, may be transmitted from the network controller 10 to any of the site controllers under direction of the operator of the network controller using standard modem tones representing bit serial data.

According to the method of the present invention, beyond establishing an individual communication link with each site controller, the network controller 10 responsive to a single direction from the operator such as the striking of a single key on the keyboard, is effective automatically (a) to communicate with a plurality of site controllers on the network and (b) to command predetermined functions be carried out at each of the selected site controllers, without further participation by the operator. By this means it becomes possible from the network controller, as a prime example, to restore service of computers at plural sites distributed throughout the network, having pre-selected the sites from the full listing of available sites in the memory 62. The preselections of the sites may be based on information that computers at certain sites are down due to software crashes, carrier losses, temperature excesses, power outages, modem failures, or other causes. The functions to be performed may be to turn-off the power to the computer at each site via the switch SW (FIG. 2), and then to turn-on the power to re-boot the computer and thereby restore service, which can be carried out automatically at all sites.

Another example of a function to be performed at all sites is to report all active alarms that have not been fixed; this might be done after a severe storm has swept through the South-East United States, and the selected sites then would be all network sites through the South-East region. The pre-selection may be for a different purpose, for example, to reset the internal clock of a computer at each site or of the site controllers in each time-zone upon change from standard to day-light time at given dates in the spring and fall. It is an important feature that with this invention it is possible to direct different functions, not necessarily the same single functions, at different sites entirely automatically in response to a single key stroke by the operator.

Accordingly, in keeping with this invention, site controllers at a plurality of remote sites on a network may be employed not only to detect and act upon transitions in the state of input signals from equipment at the sites, and report alarm conditions, but also may be employed to control operations of equipment at the sites in an efficient, cost-effective and time saving manner under command of the network controllers using the NMS software.

It will be recognized that the network controllers of this invention may be programmed to communicate with a plurality of site controllers using NMS software and change parameters of a wide range of different types. As an illustrative and preferred example, referring to FIG. 2, a plurality of site controllers throughout a network are utilized to regulate access to the buildings or the rooms in which each of the controllers are installed to monitor equipment and/or environmental conditions. For this purpose, referring to FIG. 3 which depicts one of the controllers, a port 46b in a telephone interface 46 of the site controller is connected by telephone wire 51 to a wall-mounted telephone 50 located outside a door 52 permitting access to the building or the room in which the controller is installed. An output control port 54 of the site controller is connected to a solenoid 56 associated with a lock mechanism 58 of the door. This lock mechanism 58 is of a conventional construction whereby the lock is released so that the door may be opened when the solenoid 56 is actuated by a signal from the output control port 54 of the site controller. Furthermore, the processor of the site controller is operated by a stored program which causes the processor to produce an output control signal to actuate the solenoid 56 in response to a signal from the local wall-mounted telephone 50. The arrangement may vary as desired, but preferably, after a person desiring to gain entry punches in an identifying password using the touch-tone keypad, the door lock is automatically released by the site controller through actuation of the solenoid 56. Furthermore, passwords identifying those persons allowed entry may be stored in a portion of the processor memory.

In addition, since the site controller is one of a plurality of similarly equipped site controllers on the network, and where all of these site controllers are similarly connected to a local phone 50 and to a solenoid actuated door lock 58, another example of the use of the NMS software and system according to this invention, is to transmit, under the direction of a network controller operator, a command to every one of the individual site controllers to change the passwords identifying those permitted entry. Another use would be to change the passwords for a group of some but not all of the plural site controllers in a region where there is a personnel change and the necessity arises to delete or add names to those allowed entry, requiring password changes as mentioned above. By loading into the selected sites and functions memory of the network controller a list of sites, and the function to be performed at each site—for example, deleting one password and adding another—and then starting the NMS procedure in which the sites are called in succession over the public telephone system, entirely automatically, and the command issued for each site controller to change the passwords as directed, the entire procedure of changing the list of door-entry passwords for all the selected sites on the network can be carried out without further participation by the master controller operator, saving operator time, on-line time and, therefore, telephone system charges. Furthermore, each site controller being programmed to call back reporting that the function (herein, the password change) has been completed, the execution of the password change at all the selected sites will be either displayed on the control center controller screen or logged in the control center controller memory and/or printer.

The network controller 10 is programmed to call each remote site controller and establish communication, direct predetermined functions for each particular site controller, and receive a response acknowledging the functions have been executed; this is carried out entirely automatically once the plural-site network control function has been directed by the operator. Each site controller is called in turn automatically, without delay between calls and immediately following the automatic sending of all the preset function commands for each particular site; furthermore, return messages are received, preferably through a second telephone line connection to the network controller, and stored in its memory, thereby being logged at the network controller 10. The network controller 10 is also preferably programmed so that the progress of sending the preset function commands to the remote controllers is reported and displayed on the computer video screen, as well as the responses to the commands as they are received in a continuous, on line monitoring so that the operator of the network controller can determine immediately by viewing the screen whether all remote sites have been properly called and all preset functions that had been directed have been properly executed.

AVAILABLE SITES AND FUNCTIONS

The controller 10 at the control center manages network sites by automatically dispatching commands to the remote controllers at selected equipment sites 20, 22, 24. In a principal aspect of the invention, the network management software (NMS) enables this automatic plural-site network control under direction of a user-composed network management program stored in memory and supported by the NMS. The user-composed program includes commands which actuate the remote controllers to execute a variety of possible functions at their respective sites. Thus, the user-composed program includes the actual commands which execute the management of controllers in remote sites about the network.

According to a principal aspect of the invention, the network management software (NMS) is installed in a software memory 38 in the central controller 10 allowing the controller 10 to accept, interpret and execute the user-composed program. Both the network management software (NMS) and the user-composed program may be stored by conventional means in a memory or storage device, e.g. a magnetic storage disk on a microcomputer serving as the central controller 10. When executed, the network management software (NMS) is loaded from the storage device into RAM (random access memory) in a conventional fashion. The NMS similarly initiates the loading of the user-composed program. At this point the steps of the program are interpreted and executed by the central processing unit (CPU) 26 of the microcomputer 10.

The contents of the user-composed program may be represented by the text of the program code which a user inputs by conventional means, e.g. using a program editor on a PC. Alternatively, the program code may be composed by the user working interactively with the aid of a menu driven program composition interface (PCI) provided as a module of the network management software.

The user-composed program may be structured using conventional programming techniques. Accordingly, the program includes data files or listings. More particularly, these data files comprise both network site listings and command listings.

One site listing may be considered a master site listing, containing data regarding all remote sites in the network. The storage of this data listing is represented by a section 60 of a programmable memory 62. This file 60 would typically list the necessary site communication data, for example site identification data and phone numbers.

Another listing may be considered a master function listing including all the functions which can possibly be executed on an arbitrary network site. This file would typically include a comprehensive list of available commands. The storage of the master listing of available functions is represented by a section 64 of the programmable memory 62, where the individual functions in this embodiment are denoted by a letter between a–z.

In a given network, the different remote sites may comprise different types of facilities. Accordingly, some of the functions cataloged in the comprehensive listing of all possible functions may not be available at particular sites. Thus, the master site-listing 60 may further have associated with it another listing detailing, for each particular site, the site dependent subset of available functions. This subset of available functions is represented at 66 in FIG. 1.

In accordance with conventional programming techniques, the above listings may be structured in any desired modular arrangement. Thus, the term listing is interpreted here as comprising a data structure stored either in a single data file or a plurality of modular files connected in a predetermined fashion. In either case, a given data file may further contain therein either a single data listing or plural data listings stored and identified in any convenient programming structures.

The listing of site dependent available functions, for example, may comprise an integral portion of the file containing the master site listing. Alternatively, the listing of site dependent available functions may comprise a modular file connected to the master site file.

The master listings of available commands, as a second example, may further represent or employ any number of subroutines, themselves singular or concatenated, constructed in a programming structure transparent to the user programmer at the network management level. Thus, the listings 64 of function commands may refer or employ modular subroutines stored in any of the following programming code structures well known in the field: program procedures; program functions (in this instance the term function is used in the conventional interpretation in the context of a type of subroutine construct as distinct from the network functions of the instant invention); program packages; program objects; or scripting language macros.

The programmer compiling the user-composed network management program creates two subset listings represented by the memory storage 68. These listings include a selected sites listing 68a, and a selected functions listing 68b. These listings comprise subsets of the master sites-listing 60 and the master listing 64 of available functions a–z, respectively. The subset listings 68a, 68b further may be compiled into a data construct of the user-composed program using a program composition interface (PCI) mentioned above. As an example, the PCI may comprise a screen displayed prompt of the master site listing 60 and a prompt of either or both function listings 64, 66. Such prompts may include a menu-driven mechanism interacting with the user to capture and compile screen prompted site and function data. A prompt of network sites displayed in a map may provide a user friendly PCI.

Accordingly, the selected sites listing details the identification of those remote sites which the user desires to operate. The selected-functions listing details, on a per-site basis, the functions which the user wishes to execute at each corresponding site. The selected functions listing is compiled using the correlations of sites 60 and site dependent available functions 66.

The body of all available network management functions executed by the user-composed program encompasses three general groupings. Hence, in the context of this description, the term "function" will be understood to address those commands which initiate remote controller actions, remote equipment control actions, and monitoring actions.

The group of configuration functions concern what is termed the programming of the remote controller, i.e. modification of data stored in the parameter memory of the remote controller. In a preferred embodiment, this memory comprises a writable non-volatile storage device. The remote controller may be initialized with default values which can be stored in a default parameter PROM (programmable read-only memory), for example.

The configuration of a given remote controller is predicated on the values of this parameter data. The following is a sample list of the parameters included in the design of the remote controller. This list is provided by way of example and is not considered to be definitive nor comprehensive. Explanations of these parameters follows the list.

Identification and Communication Parameters:
Remote controller serial number; Remote controller identification; Multi-level access passwords; Telephone numbers; Telephone type; Number of attempts in call initiation; Number of rings to call response; Autodial status; Logging status;
Fault / Alarm Parameters:
Digital status; Digital alarm; Digital type; Digital position; Digital duration; Analog status; Analog alarm; Analog minimum; Analog maximum; Analog duration; Temperature status; Temperature alarm; Temperature minimum; Temperature maximum; Temperature duration;
Control Port Parameters:
Control status; Control type; Control position;

Regarding the identification and communication parameters, the remote controller has a serial number by which it can identify itself when polled by a central controller. In a preferred embodiment, this identifier is fixed and can not be modified. The separate remote controller identification is intended as a convenient user defined identifier. This parameter may be defined as the telephone number of the remote site, for example.

Multiple user access levels, identified by user access passwords, are supported by the site controllers. User passwords insure that no unauthorized user is allowed to control a remote controller or the equipment attached thereto. The user password, in identifying the level, enables a commensurate degree of access to the system. In a preferred embodiment, the present network management system supports three levels of users.

The highest level may be termed the programmer user level. In this embodiment, this is the only class of user allowed to program a remote controller by reconfiguring its parameters. Also, a programmer is the only individual allowed to establish and change the various user passwords themselves. Further, a programmer can execute the functions available to the following two subordinate user levels.

The second user level in the disclosed preferred embodiment is that of an operator. At this level, a user is permitted to acknowledge alarms, control site equipment, and obtain status reports from the site controller. However, a user at the operator level is precluded from reconfiguring the site processor. The lowest priority user is denoted by the clerical level which only enables access to status reports.

Telephone numbers list users, e.g. field engineers, in order, which the remote controller will attempt to contact in predetermined circumstances through the public switched telephone network. In this regard, the voice synthesis capability of the remote controller is utilized as disclosed in U.S. Pat. No. 4,748,654. Accordingly, the remote controller communicates with a human user issuing a status report, and/or describing the nature of any system trouble and guiding the engineer through a voice menu for remedy.

Telephone numbers are also included corresponding to modem interfaced-logging devices. These are detailed below and may comprise a printer or microcomputer with magnetic storage disk. The telephone type denotes a tone or pulse phone.

The number of call attempts dictates the number of consecutive attempts which the remote controller will execute if an initiated call is unsuccessful. The number of rings dictates the number of rings counted in an incoming call at the remote controller before it responds.

The autodial status, assuming either an enabled or a disabled (E/D) state, comprises the permit to call the user or logging device telephone numbers. The logging status parameter, also assuming E/D states, comprises the permit allowing the remote controller to buffer events to be sent to the logging devices. One logging status parameter is associated with each logging device.

A logging device may comprise a printer which provides a hard copy of events. Alternatively, a logging device may comprise a microcomputer which can display event data on screen, or record the data on a magnetic storage disk or by routing to a printer. Further, logging devices may be either located locally at the remote site or remotely to the nodal site itself.

This second remote site is termed a logging site. Hence, in FIG. 1, a logging device 34 represents a magnetic disk memory section of the microcomputer network controller 10. In this instance the logging site, remote from the equipment site, comprises the control center itself, though it could be a third site. Logging devices 40, 42, 44 represent local equipment site apparatus.

Regarding the fault/alarm parameters, the configuration of these parameters establishes which sensors will be actively monitored, and defines the thresholds distinguishing faults and alarms. The digital, analog and temperature status parameters (assuming E/D states) dictate if these respective sensor input ports will be actively read.

A fault condition is triggered in the digital sensors when the remote controller reads the digital sensor position (open or closed [O/C]) as being opposite the normal position. A fault condition in the analog or temperature sensors occurs when the remote controller detects readings in the respective sensors beyond the corresponding minimum or maximum parameter limits. Preferably the remote controller comprises thresholds such that all candidate fault readings must hold for longer than a brief predetermined period of time, e.g. two seconds, before being considered actual faults. In all three sensor types, fault conditions graduate to alarms when they have existed for longer than the corresponding durations programmed in the parameter memory by a user.

The digital, analog and temperature alarm parameters (assuming E/D states) dictates whether the remote controller will generate an alarm if a fault condition exists for longer than the programmed duration. Finally, the digital type parameter denotes the type of contact, either Form "C" or Form "A".

Regarding the control port parameters, the control status dictates whether changes are allowed to the control output ports (latched ports assuming E/D states whereas momentary ports are pulse controlled). The control type parameter identifies the associated port as being either manual or automatic (M/A).

Equipment connected to the manual type control output ports of a remote controller is controlled only by commands issued directly from a user or commands stored by a programmer in a selected functions listing of the user-composed management program. These contrast with the automatic control output ports. The states of automatic control ports may be controlled in this manner, predicated on the contents of the control status parameter, but are further controlled by the state of an coupled input port.

The control position identifies the normal condition of the output control port as being opened or closed. In automatic control output ports, a change in the state of the associated input port, beyond the parameters defining an alarm state, reverses the control port from the normal position. A further change in the input port readings reverting back within the normal range stored in the monitor parameters again reverses the control port position, back to normal this time.

The group of monitoring functions include alarm acknowledgment functions, unacknowledged alarm logging functions, alarm history logging functions, and site processor inventory functions. As noted above, a remote controller may be associated with one or more logging devices, e.g. printers or microcomputers. A microcomputer logging device may further be connected to a printer or any other device, including further computers.

Either type of logging device may be locally situated, on site with the remote controller, as at 40, 42, 44. Alternatively, a logging device may be located at a logging site remote to the equipment site itself. In the illustrative embodiment, the control center comprises the logging site as the magnetic disk storage device 34 is located at the network controller 10.

With the remote controller logging status parameter of a particular logging device configured in permission mode, event data is transmitted to the central controller 10. Thus, event data is transmitted from the remote site 1 controller for example, over the communication line 12. This communication is effected by any conventional data transmission apparatus using an established data transfer protocol. The transmission is received by the input ports 70 of the central controller 10. A communication interface 19 which includes a modem, transmits the data over the data bus 32 to the disk storage device 34.

Each remote controller preferably has an internal status buffer partitioned for each logging device in a nonvolatile memory. With a permission configured logging status parameter, this buffer stores the following types of events in order of chronological occurrence:

fault occurrences;
fault clearances;
alarm occurrences;
authorized user acknowledgements of alarm;
acknowledging user identification;
alarm clearances;
control port state transitions (indicating equipment control events—automatic or manual);
date and time of event occurrence; and
additional activity information.

The additional activity information provides a description of the context of the logged event. This description may be, for example, whether an alarm event is reported or not, or acknowledged or not; whether an analog or temperature input is low or high; or whether a control port is on or off after its state transition.

Each remote controller preferably further includes a buffer partitioned in the section of memory containing alarms, for storing alarm acknowledgement parameters. This includes an alarm status indicating whether the occurrence of an alarm event has been acknowledged. These parameters further include the identification of the acknowledging user, or identification indicating that the network management software itself has acknowledged. The network management software acknowledges alarms subject to commands directing acknowledgement, if such commands are included in the user-composed program. Thus, when such commands are included in the user-composed program, the central controller 10 transmits its identification to the remote controller in this context.

The site processor inventory function can be used to direct the storage and reporting to a logging device of the identity of each network site. The alarm history logging function concerns specifically acknowledged and cleared alarms.

The group of remote equipment control functions commands the site processor to actuate or disable on-site equipment. This is done by including, in the user-composed program file, commands directing the remote controller to change the state of the control output ports corresponding to the equipment concerned. As noted above, if the control status parameter is configured in the remote controller to permit changes to the control output ports, the associated equipment is available for user directed control. This is true in both manual and automatic types of control output ports.

Figure 3:
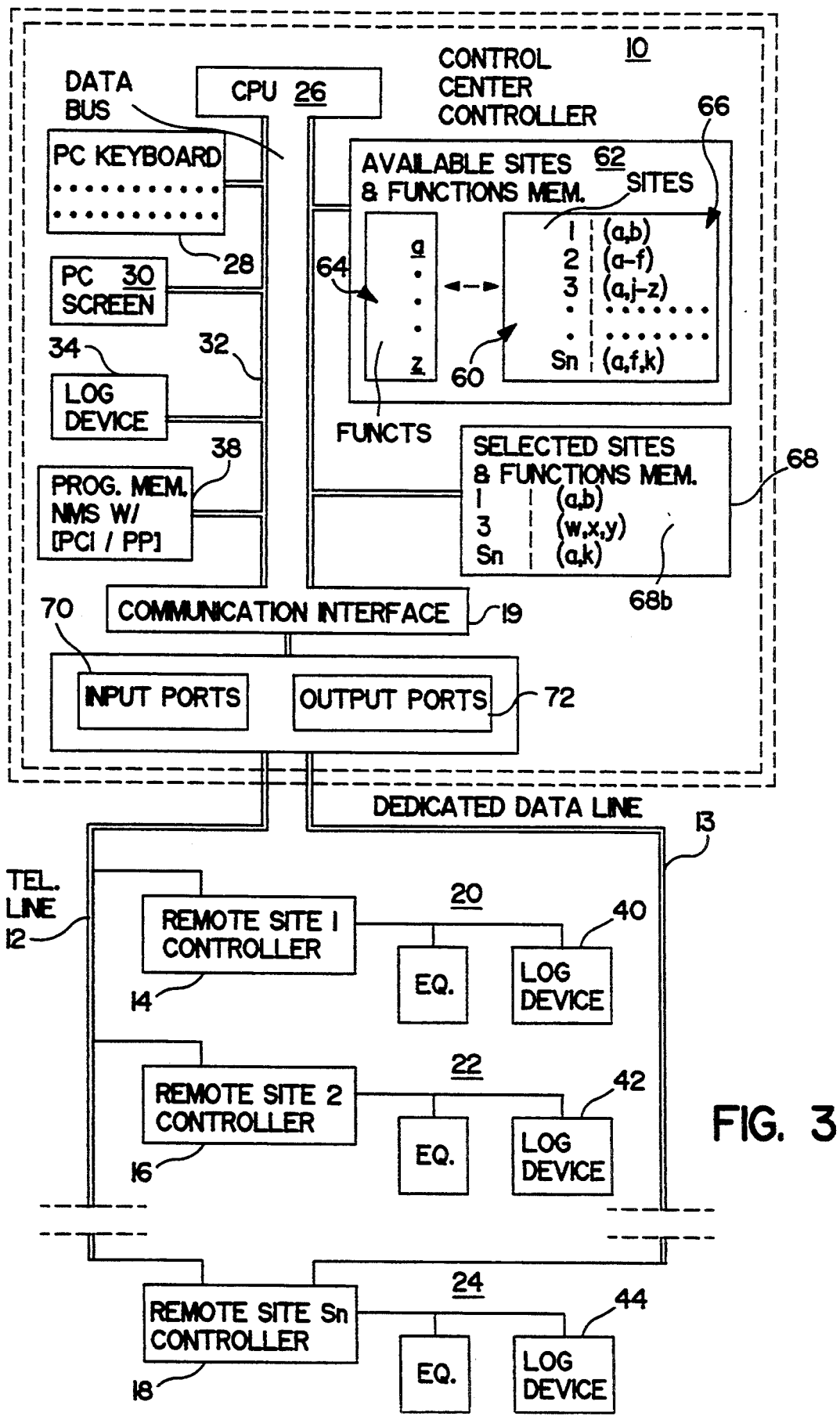
FIG. 3 is a schematic illustration of a another embodiment of a network according to the invention.

FIG. 3 shows another illustrative network according to the present invention. The same reference numerals are used for components corresponding to those shown in FIG. 1. As a principal feature of this embodiment, the network provides redundant communication paths by way of two communication links 12 and 13 between the network control center controllers 10 and the 89 remote site controllers. While the communication link 12 still represents a regular dial-up phone line connected through the public telephone system, this link comprises a backup or alternate data line. A primary communication link is provided by means of a dedicated data line 13 of the public telephone systems. Such data lines are normally available.

As illustrated in FIG. 2, each site controller has a set of I/O devices. These include a telephone interface 46 and a serial interface 48. The telephone interface 46 has a port 46a providing a coupling between the telephone line 12 and an internal modem in the site controller. The dedicated data line 13 is connected to a port 48b in the serial interface 48 of the remote controller through a digital service unit (DSU), multiplexer (MUX), and external modem.

In this embodiment of the invention, the network controller 10 further executes a polling procedure to determine the status of the communication links between the network controller 10 and any one or a selected group of the remote site controllers. Hence the network management software (NMS), stored in the memory 38 and used to control processing of the CPU 26, further includes a conventional polling process program denoted PP in FIG. 3.

The dedicated data line 13 acts as the default or primary communications carrier. The network controller 10 periodically issues polling signals through the dedicated line 13 at predetermined intervals to each remote controller. This is done under control of a polling schedule employed by any one of the polling programs well known in the field. At the other end the remote site controller detects these polling signals and responds back through the same dedicated line 13 indicating the soundness of the communication link.

The absence of a predetermined number of polling signals indicates to the remote site controller an alarm condition corresponding to a failure in the dedicated line 13 or the components connected thereto including in particular, the DSU, MUX and modem. For this purpose the remote site controller further has configured in its parameter memory the frequency of expected polling signals, which are timed by the internal clock of the remote site controller. Also stored in the parameter memory is a predetermined number of allowed missing polls. Thus, if the polling signals are momentarily interrupted the remote site controller 14 will not instantly conclude that an alarm condition exists in the data line 13.

However, when an amount of time has elapsed greater than that corresponding to the number of allowed missing polling signals, an alarm condition is generated. In this instance, the remote site controller 14 is preferably programmed to respond by dialing-up the control center controller 10 on the alternate line 12. For this purpose, the telephone and serial ports are respectively connected to the communication lines 12 and 13. Accordingly, the remote site controller 14 changes its communication link to the control center controller 10 from the default dedicated line 13 to the backup telephone line 12. Further, the remote controller 14 transmits information to the network controller 10 reporting the alarm condition. The network controller 10 is notified that, until correction of the error in line 13, future communication must occur through the phone line 12. According to the invention, such a control action switching communications paths can be executed by the network controller 10 through the network management software (NMS).

Figure 4:
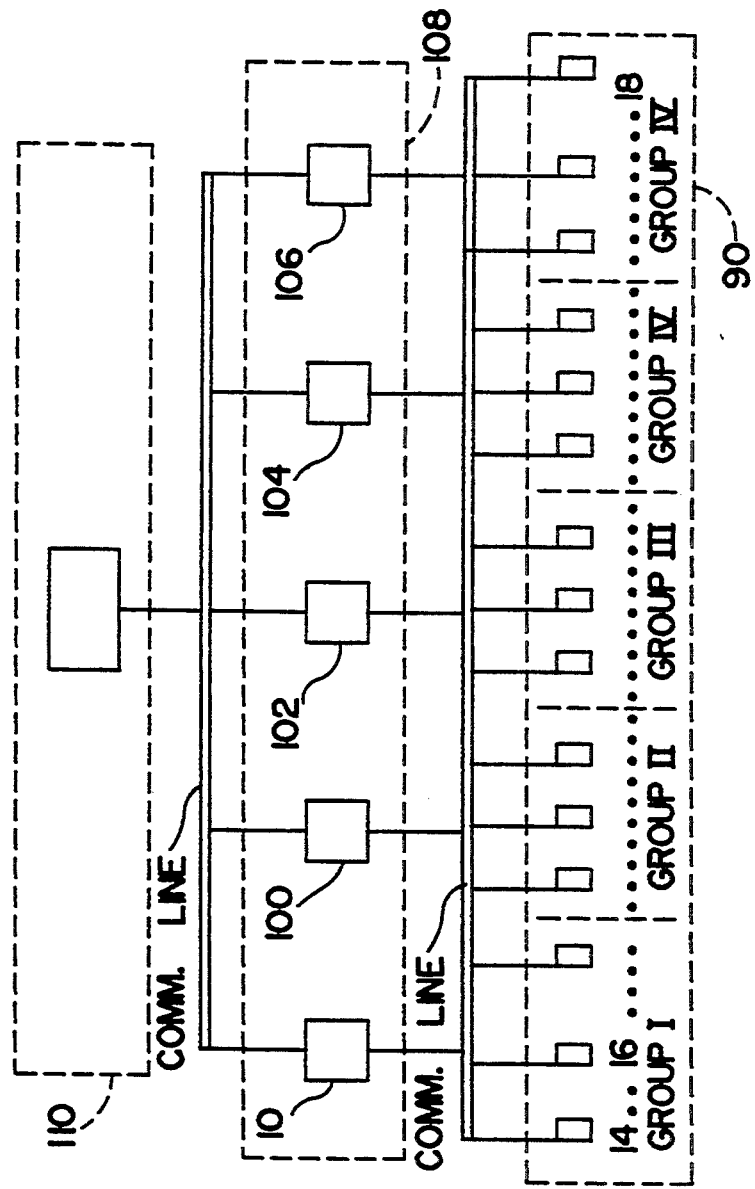
FIG. 4 is a schematic illustration of a distributed control system according to the invention, and a schematic of a layered control system according to the invention.

The combination in the present invention of the network management software (NMS) and the programmable controller 10 affords several possibilities in network management systems. As mentioned above, a network may have a plurality of programmable controllers loaded with the NMS and distributed throughout the network. An example of an application of such a distributive control configuration is illustrated in FIG. 4.

The original network controller, shown at 10, is still connected to a first layer 90 of remote controllers 14, 16, 18, for example through the telephone system. It is understood that in a large network there are N such controllers, possibly at different types of equipment facilities. Further, in parallel with the network controller 10 are a plurality of other network controllers 100, 102, 104, 106 forming a second layer 108 of distributive controllers. Each controller in this layer 108 is connected to control any of the remote controllers.

This configuration enables a distributive control system such that access to network control is not necessarily confined to a single controller at a single site. The possibility of such a configuration is more flexible as contrasted with a system having single centralized control only.

A distributive control configuration may be desirable, for example, in a large complex network involving operation of different types of facilities. In such an application, one expert operator may be assigned to manage a group of facilities of one particular type. From a different location, or at least a different PC within the second layer 108, other such operators may control their respective facility groups. Partitions of such groups are represented schematically in FIG. 4.

In another control system also illustrated in FIG. 4, the network may include a third layer 110 of programmable controllers, also comprising PC's for example, communicating with the plurality of distributed network controllers in the second layer 108. Each of these higher level controllers may be equipped with the necessary communication hardware and software required to command a network controller to execute network management functions.

Given the foregoing, modifications of the invention should now be evident to a person skilled in the art. Such variations are intended to fall within the spirit and scope of this invention as defined by the following claims.

I claim:

1. A method of automatically managing, from a master control center at a master site, a network of a plurality of remote function-executing apparatus each including a programmable microprocessor, memory and input/output devices interconnected by a bus, respectively located at sites remote from the master site, comprising the steps of:

(1) storing in a storage device at the master control center a master site listing including site communication data of all of the apparatus located at the remote sites of the network;

(2) storing in the storage device a master function listing of site-dependent available functions including available function commands, for all apparatus located at the remote sites on the network;

(3) operator selecting a selected-sites listing representing a plural sub-set selected from the master site listing;

(4) storing in the storage device the selected-sites listing;

(5) operator selecting a selected-functions listing representing a sub-set selected from the master function listing which are correlated with corresponding sites in the selected-sites listing;

(6) storing in a correlated-listing in the storage device the selected-functions listing correlated with the corresponding sites in the selected-sites listing;

(7) after the correlated-listing has been stored containing plural selected sites and selected functions, upon a single execution signal set an operator and without further participation by the operator, automatically communicating, in turn, from the control center with the apparatus of all the plural selected sites in the correlated-listing and transmitting, in each communication, function commands representing the selected functions in the correlated-listing; and (8) executing the selected functions by the apparatus at each of the selected sites upon receipt of the function commands.

2. A method according to claim 1 wherein the automatic management of the network of remote apparatus is distributive and can be executed from a plurality of programmable network control centers distributed throughout the network.

3. A method according to claim 1 wherein the step of operator-selecting the selected-sites listing further includes the step of prompting the operator in the selection of the sites with at least a portion of the stored master site listing of all the plural sites displayed in a map.

4. A method according the claim 3 wherein the step of operator-selecting the selected-functions listing further includes the step of prompting the operator in the selection of the functions with a display of the stored master function listing.

5. A method according the claim 1 wherein each site includes a respective on/off switch and each remote site apparatus is connected to operate the respective on/off switch, and the available functions at each site includes a re-boot function of turning the switch at that site off and, after an interval, on, and wherein, in the steps of operator selecting the selected-functions listing, the re-boot function is included for sites of the selected-sites listing, whereby the on/off switches at all the selected sites are operated to execute the re-boot function in response to the single execution signal set by the operator of the master control center.

6. A method according to claim 1 including the further step after execution of the function commands by the apparatus at each of the selected sites, (9) under control of a program stored in the memory of the apparatus, transmitting back to the master control center return messages reporting completion of the selected functions.

7. A method according to claim 6 wherein the master control center includes a screen,

(10) displaying on the screen completion of the selected functions at the selected sites on the network upon receipt at the control center of the return messages.

8. A method according to claim 6 including the further step,

(10) logging in the storage device of the control center completion of the selected functions at the selected sites on the network upon receipt at the control center of the return messages.

9. A network of control centers connected for managing apparatus located at remote sites, the network comprising:

a plurality of apparatus each including a programmable microprocessor, memory and input/output devices interconnected by a bus, respectively located at the remote sites; and a user-programmable network control center connected to transmit command via communication link to automatically manage the apparatus at the remote sites, the network control center having a processor and a program memory having sections containing a network management software (NMS) program and a user-composed network management program, the sections containing the user-composed network management program including:

(1) a master site memory section which stores a master site listing of all of the remote sites including site communication data, enabling a user to compose a selected-sites listing representing a sub-set of plural sites from the master site listing;

(2) a master function memory section which stores a master function listing of all possible functions to be executed by the apparatus at each site including available commands to transmit to particular sites, enabling a user to compose a selected-functions listing of individualized functions corresponding to the selected-sites listing and representing a sub-set of the master function listing;

(3) a correlated selected sites and functions memory section which stores the selected-functions listing for all the plural sites correlated with the selected-sites listing chosen by the user, the selected-functions listing containing individualized function commands, correlated with and corresponding to each site in the selected-sites listing, and representing function which the user selects for the apparatus to execute at each corresponding site; and the network control center having means, including a communication interface and the processor operated by the NMS program, responsive to a single execution command set by the user after the correlated listing has been stored for all the plural selected sites, for communicating in turn automatically over a respective communication link with the apparatus of all the plural selected sites in the selected-sites listing and for transmitting the commands of the selected-functions listing to the apparatus at each selected site, without further participation by the user.

10. A network according to claim 9 including a plurality of such network control center formed in at least one layer.

11. A network according to claim 9 including a plurality of network control centers distributed throughout the network and forming at least two layers.

12. A network according to claim 9 further comprising a plurality of programmable higher level controllers, forming a third layer of controllers, connected to control a plurality of network control centers in a second layer of controllers.

13. A network according to claim 9 wherein the memory of the apparatus at each of the remote sites includes a stored program which operates the microprocessor of the apparatus to transmit back to the master control center return messages reporting completion of the selected functions after execution of the function commands, and wherein the master control center includes means for logging in completion of the selected functions upon receipt of the return messages.

14. A programmable network control center for automatically managing under direction of a user a network of a plurality of remote programmable apparatus respectively located at remote sites, the network control center comprising:

a master site storage means for storing a master site listing of all the remote sites including site communication data, and for enabling user selection of particular remote sites from the master site listing;

a master function storage means for storing a master function listing of all possible functions to be executed by the apparatus at each site including available commands to transmit to particular sites, and for enabling user selection of particular functions for particular sites from the master functions listing;

a selected site storage means for storing a selected-sites listing of plural sites chosen by the user from the sites listed in the master site storage means;

a selected function storage means for storing a selected-functions listing of functions, correlated for each site listed in the selected-sites listing, and chosen by the user from the functions listed in the master functions storage means; and processing means for automatically transmitting over the network, after the selected-functions listing has been stored for the plural sites of the selected-sites listing, upon a single execution signal set by the user and without further participation by the user, to all the plural sites, commands representing each function listed in the selected-functions listing.

15. A network control center according to claim 14 wherein the master function memory section includes a site-specific function memory section storing a site correlated listing of those functions, listed in the master function listing, available at each site.

* * * * *

UNITED STATES PATENT AND TRADEMARK OFFICE
CERTIFICATE OF CORRECTION

PATENT NO. : 5,426,421
DATED : June 20, 1995
INVENTOR(S) : William F. Gray

It is certified that error appears in the above-indentified patent and that said Letters Patent is hereby corrected as shown below:

Column 20, Line 32, change "command" to --commands--;

Line 62, change "function" to --functions--.

Column 21, Lines 17 and 18 change "controllers" to

--control centers--;

Line 18, change "controllers" to --control centers--;

Line 20, change "controllers" to --control centers--.

Signed and Sealed this

Twenty-first Day of November, 1995

Attest:

BRUCE LEHMAN

Attesting Officer      Commissioner of Patents and Trademarks